Figure 1:
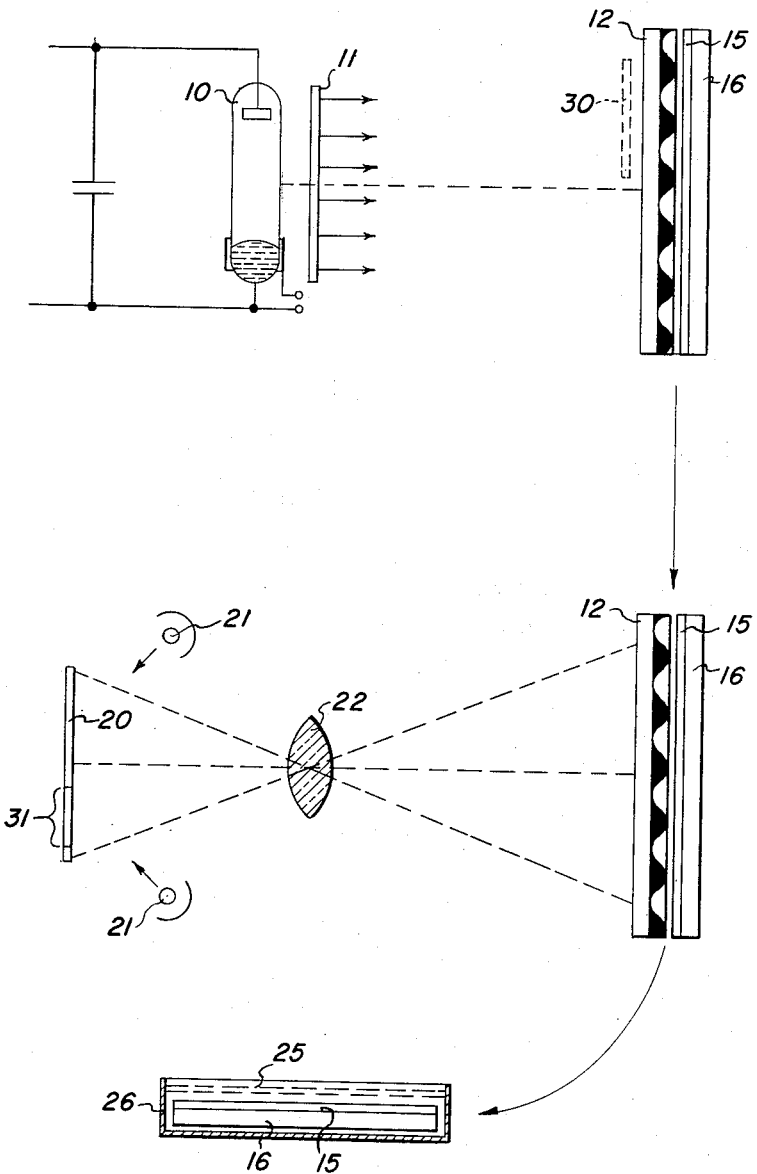

DONALD J. HOWE
INVENTOR.

Oct. 12, 1954   D. J. HOWE   2,691,580
INCREASING CONTRAST OF HALFTONE REPRODUCTIONS
Filed Aug. 27, 1953

2 Sheets-Sheet 2

DONALD J. HOWE
INVENTOR.

BY

ATTORNEYS

Patented Oct. 12, 1954

2,691,580

UNITED STATES PATENT OFFICE 2,691,580

INCREASING CONTRAST OF HALFTONE REPRODUCTIONS

Donald J. Howe, Rochester, N. Y., assignor to Eastman Kodak Company, Rochester, N. Y., a corporation of New Jersey Application August 27, 1953, Serial No. 376,847

3 Claims. (Cl. 95—5)

This invention relates to halftone reproduction.

The object of the invention is to provide a process for increasing the contrast of the halftone reproduction such as a halftone negative.

Another object of the invention is to provide such a process which is particularly convenient to carry out and which requires a minimum of change in the regular process being used in making the halftone negative or positive.

The invention is particularly useful where part of a given subject or copy is to be reproduced at normal contrast and the rest requires increased contrast.

According to the invention the halftone negative or other record is made on a Clayden desensitizable photosensitive sheet material such as the high contrast materials commonly used for making halftone negatives. A halftone screen, either a contact screen or a ruled screen at halftone distance, is placed in front of the material. The material is then exposed twice through the screen, first to a uniform, high intensity, short duration exposure to Clayden desensitize the areas behind the transparent parts of the screen and second, to a non-halftone image such as a continuous tone or a line image, the second exposure being of average intensity and average duration. The exposed film is then developed in the usual way.

The Clayden desensitizing through the same screen that the image exposure is to be made tends to reduce the effective contrast of the screen and hence, as explained at length in U. S. 2,304,988 Yule, it increases the contrast of the halftone image obtained through that screen.

Clayden desensitization

The Clayden effect is well known and was discovered in 1899. It is described for example in "The Theory of the Photographic Process" by Mees (MacMillan Co. 1942) page 254. Not all silver halide emulsions show the effect in all developers. However, a Clayden desensitizable material is merely any one which shows the well-known Clayden effect when given a brief high intensity exposure followed by a longer exposure and developed in a suitable developer.

This is all well understood. However, for the sake of precision in defining the present invention which can use any "Clayden desensitizable material," this latter term itself is carefully defined below in a way fully correlated with the particular developer being used in the invention or to be used with the material. The most practical definitions of "Clayden desensitizable material" are in terms of the simple methods actually used to determine whether the material is Clayden desensitizable or not and the most definitive method is the so-called crossed step tablet method. A step tablet is a gray or colored filter (or print) made up of a series of areas or steps of different optical densities.

In the crossed step tablet test, the film or other material to be tested is given a short high intensity (Clayden) exposure through a step tablet. The tablet is then rotated 90° relative to the film and a second, lower intensity, longer exposure is given and the film is processed. Thus a single test shows the effects of various degrees of "Clayden" exposure on various degrees of regular subsequent exposures. Or more exactly it shows the effect on the film sensitivity in terms of various degrees of subsequent exposures.

If at some one step in this crossed tablet test, the sensitivity of the material to the second exposure is reduced by the first exposure, the material is Clayden desensitizable. The same developer is used for the test as will be used with the material in practice and hence any effect the developer may have is fully taken into account.

In fact a single universal test can be prescribed for all known silver halide photosensitive materials merely by using an intensive enough lamp to expose the slowest possible materials along with a step tablet having a total density range greater than 8.0 so that at the dense end of the range, the fastest possible materials are not overexposed. One such universal test is as follows:

The step tablet has 28 steps starting with approximately zero density and increasing in intervals of .3 density to a maximum of 8.1.

The flash lamp chosen is a standard one having 18,000 lumen seconds output in about .0005 second. This duration is measured from the time the flash reaches half its peak intensity to the time it again falls to this value. It is placed two feet from the step tablet and film being tested. If a source of different intensity is used, the distance is varied accordingly. The first exposure consists of one flash from this lamp.

Then after rotating the step tablet 90°, the second exposure is given by a 1000-watt tungsten lamp at 2 feet from the tablet and film, the time of exposure being two minutes.

The material is then processed and the effect of the two exposures for various values of each is noted. If the effect of the second exposure at any one step (constant second exposure) is decreased by an increase in the flash exposure, the material is Clayden desensitizable. Useful Clayden desensitizable material is any one which shows even a half step decrease in the effect of the second exposure. Stated precisely, if, at any step of the test piece, the second exposure has to be increased by 41% (the equivalent of one half step) in order to get an effect equal to that obtainable in the absence of the preflash exposure, the material is Clayden desensitizable in a practical, useful sense. To avoid unnecessary repetition, the term "Clayden desensitizable material" is herein limited to this practical definition and covers only materials showing at least a half step desensitization in the test just prescribed.

The present invention is not confined to any particular processing procedures. The same definition holds whether the exposures and processing result in optical density, color, hardness or resistance to etching, or washing or resistance to or affinity for certain inks. And, of course, the particular equipment and exposures used in this standard test do not in any way limit the processes used in the present invention itself.

It is noted that this definition distinguishes over solarization and so-called L. I. D. (low intensity desensitization) effects which occur only at much higher intensities by the fact that in the Clayden effect increase in the second exposure overcomes rather than enhances the desensitization.

It is repeated that Clayden desensitization is a well known phenomenon and this definition is included here merely to have a precise basis for defining this known feature in combination with other features of the present invention.

Figure 2:
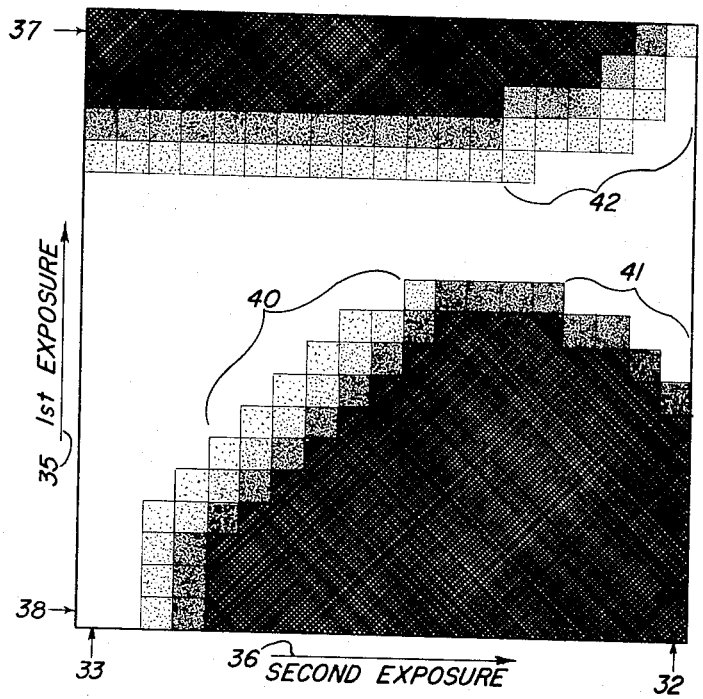
Figure 3:
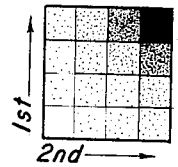
Figure 4:
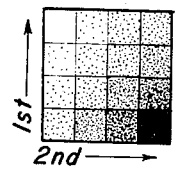
Figure 5:
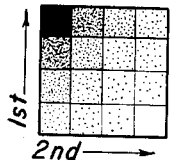

The invention will be more fully understood from the accompanying drawings in which:

Fig. 1 is a flow chart illustrating the preferred embodiment of the invention;

Fig. 2 illustrates a processed sensitometric strip from a crossed step tablet test of a material showing all three effects, Clayden desensitizing, L. I. D. and solarization;

Figs. 3 to 6 illustrate the various possible results obtainable from a brief high intensity exposure followed by a longer lower intensity exposure.

In the drawing a vapor flash lamp 10 through a light diffusing screen 11 and a contact halftone screen 12 exposes a Clayden desensitizable layer 15 carried by a support 16. The lamp 10 illustrated schematically may be of the type shown for example in U. S. Patent 2,152,639 Edgerton. Various forms of such lamps are well known. The vapor flash lamp gives a high intensity flash of about .0005 seconds duration. Without moving the screen 12 relative to the surface 15, the material is then exposed to a continuous tone image of a drawing or positive picture 20 focused by a lens 22. The drawing or other copy 20 is illuminated by tungsten lamps 21 or by arc lights and the exposure requires several seconds and in some cases a few minutes if the sensitive layer 15 is of the extremely high contrast so-called "lith" type.

After the material 15 has received both exposures, it is developed in a developer 25 carried in a tray 26, the developer being the one normally used for the material 25. It is also the same as used in selecting the material 15 as a Clayden desensitizable one as determined by the above recited test. In general the Clayden effect is greatest when a so-called surface developer is used which affects the surface of the silver halide grains more than it does the interior of the grains. Clayden effect is primarily associated with silver halide emulsions. Development may include several steps such as fixing, washing, drying, etc.

The invention is not limited to the type of halftone screen used or to the manner in which the flash exposure is given through the screen although, of course, with a ruled screen, the flash exposure must be given through the lens aperture such that the desensitization pattern is in register with the halftone image exposure. The image exposure may be either by projection as shown or by contact although the latter requires an extremely thin contact screen and a relatively small light source to insure sharpness of the image.

It should be noted that the present invention does not involve prescreening in the usual sense since the image exposure itself is made through the screen. The Clayden exposure does not produce the screen nor does it affect the production of the screen in any way. It merely affects the contrast of the resultant screened record.

This system has many advantages over other methods of controlling contrast in that it does not interfere with the normal exposure in any way. It is particularly useful where two different images are to be recorded side by side, one of which requires a higher contrast than the other, for example, a picture with printing underneath the picture. Often when such an arrangement is arranged to give proper contrast to the picture, the printing is not contrasty enough. According to the present invention the area of the film to receive the picture is covered and the remaining area is given a Clayden desensitizing exposure. The whole film is then exposed to both the picture and the printing simultaneously and both are reproduced with proper contrast.

Obviously it is not convenient to produce this type of contrast control with systems requiring a color filter since in the first place it is not convenient to place a color filter over part only of a film and in the second place, the exposure required through the color filter is greater than without the filter. The dotted lines 30 show the position of the mask for covering part of the film 15 which is not to receive Clayden desensitization. The area 31 of the copy 20 is then reproduced at lower contrast than the rest of the copy 20. It should also be quite apparent that this method of increasing contrast does not require any change in the standard processing procedures used. The method is extremely simple but quite effective and thoroughly practical.

If both the first and second exposures were made to the same image, instead of the first exposure being a flash, there would be no appreciable increase in contrast. However, color correction could then be applied if the two screened image exposures were through different filters somewhat similar to U. S. Patent 2,444,867 Yule which does not involve screens or halftones. In this patent color correction is due to the fact that the Clayden exposure is to a "red" separation and the subsequent regular exposure is to a "green" separation, for example. This "masking" can also be obtained by having only one of the exposures screened—either the Clayden "red" exposure or the regular "green" exposure—and by having the other exposure "continuous-tone."

The present invention differs from all such arrangements by having the first exposure a uniform flash and both exposures through the screen.

Fig. 2 illustrates the result obtained with a typical crossed step tablet test. The film after a brief high intensity first exposure through a step tablet having 19 steps in the example shown, is rotated 90° relative to the tablet and then given a second lower intensity longer duration exposure. It is then processed and appears as in Fig. 2.

During the first exposure the row 37 is exposed through the zero density step of the tablet and the row 38 is exposed through the densest step. Thus the intensity of the first exposure increases from bottom to top as indicated by arrow 35. Column 33 may be considered as the result of the first exposure alone since in this column the second exposure has no appreciable effect. It is noted that the material is a very contrasty one going from clear to maximum density in only a few steps near the top of column 33.

During the second exposure, the column 32 is exposed through the zero density step and the column 33 is exposed through the densest step. Row 31 may be considered the effect of the second exposure alone which increases in the direction represented by the arrow 36.

The Clayden effect appears in the region 40 where increasing first exposure desensitizes the film so that more second exposure is needed to obtain the same density. The order in which the exposures are given is critical and in general there is little or no desensitization if the longer exposure is given first although such "reversed Clayden" effects are not unknown.

Solarization is indicated in the region 41 where the effect of the two exposures add to cause reversal. This effect is independent of whether the material is Clayden desensitizable or not. It is also more or less independent of the order in which the high and low intensity exposures are given.

L. I. D. (low intensity desensitization) appears in region 42. It is always at a much higher intensity of exposure than the Clayden effect. The first exposure produces a latent image by itself and the second exposure destroys this image. L. I. D. may also stand for latent image destruction. However, this effect is independent of the order in which the exposures are given and if the lower intensity exposure is given first it desensitizes the film to the high intensity exposure. Note that the intensity of the high intensity exposure which causes the Clayden effect is actually lower than that which gives a latent image by itself in the particular example shown although this is not necessarily true particularly with lower contrast materials. The intensity of the second exposure is also very high in the L. I. D. region and the L. I. D. effect may be related to solarization. However, it can be counteracted by increasing the first exposure which is not true of simple solarization.

Figure 6:
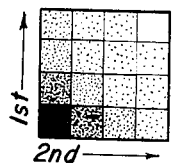

In Figs. 3, 4, 5, and 6 the first exposure is high intensity short duration and the second is lower intensity longer duration. If the two exposures are merely cumulative, the result is that shown in Fig. 3 with the minimum effect in the lower left corner and the maximum in the upper right corner. Desensitization (Clayden in this case) results in the distribution of density shown in Fig. 4. Latent image destruction by increasing second exposure is similarly illustrated by Fig. 5. Finally, solarization involves reversal and less density due to increase in either exposure and the result is shown in Fig. 6. Thus it is quite easy to recognize the different effects directly from a crossed step tablet sensitometer strip.

I claim:

1. The method of making a halftone record on a Clayden desensitizable silver halide photosensitive sheet material which comprises placing a halftone screen in front of the material, exposing the material through the screen twice, first to a uniform high intensity short duration exposure to Clayden desensitize the areas behind the transparent parts of the screen and second to a continuous tone image of lower intensity and for longer duration and then developing the material.

2. The method of making a halftone record on a silver halide photosensitive sheet material which is Clayden desensitizable by exposures of duration shorter than A which comprises placing a halftone screen in front of the material, exposing the material through the screen twice, first to a uniform high intensity exposure of duration shorter than A to Clayden desensitize the areas behind the transparent parts of the screen and second to a non-halftone image of lower intensity and longer-than-A duration and then developing the material.

3. The method of making a halftone record on a silver halide photosensitive Clayden desensitizable sheet material with greater contrast in one area of the record than another which comprises placing a halftone screen in front of the material, exposing only said one area through the screen to a uniform high intensity short duration exposure to Clayden desensitize the areas behind the transparent parts of the screen and then exposing both areas through the screen to an image of lower intensity and longer duration and then developing the material.

References Cited in the file of this patent

UNITED STATES PATENTS

| Number | Name | Date |
|---|---|---|
| 2,306,936 | Chambers | Dec. 29, 1946 |

OTHER REFERENCES

Flader et al., "Modern Photoengraving," Modern photoengraving, Publishers, Chicago, 1948, pages 106–108.

Clerc, "Ilford Manual of Previous Work," Ilford Ltd., London, 5th ed., 1951, pages 173–175.